United States Patent [19]

Grohmann

[11] Patent Number: 5,102,535

[45] Date of Patent: Apr. 7, 1992

[54] PLANT TO PRECIPITATE SUSPENDED MATTER OUT OF WATER

[76] Inventor: Andreas Grohmann, Ringstrasse 73a, D-1000 Berlin 45, Fed. Rep. of Germany

[21] Appl. No.: 559,934

[22] Filed: Jul. 30, 1990

[51] Int. Cl.⁵ .................. B01D 21/24; B01D 24/16
[52] U.S. Cl. .................. 210/104; 210/123; 210/199; 210/202; 210/206; 210/265; 210/275
[58] Field of Search .............. 210/104, 123, 199, 202, 210/206, 265, 275

[56] References Cited

U.S. PATENT DOCUMENTS

| | | | |
|---|---|---|---|
| 1,433,357 | 10/1922 | Ellis | 210/265 |
| 3,480,542 | 11/1969 | Bucksteeg et al. | 210/265 |
| 3,931,009 | 1/1976 | Davis | 210/123 |

FOREIGN PATENT DOCUMENTS 3540508  5/1987  Fed. Rep. of Germany .

Primary Examiner—Stanley S. Silverman
Assistant Examiner—Robert James Popovics
Attorney, Agent, or Firm—Spencer & Frank

[57] ABSTRACT

Plant to precipitate suspended matter out of water, such as surface run-off water, industrial waste water, biologically treated waste water and landfill leachates with in-pipe flocculation, a filter filled with granular filter material situated above the sedimentation tank of the plant the direction of flow through which is from top to bottom and a backwash tank and whose subsequent sedimentation and filtration stages comprise the following features: that the backwash tank for filtered water is situated above the filter; that a float seals off an aperture with an enlargened cross-section connecting the filter with the backwash tank in a position raised by buoyancy; that a bypass directs the treated filtered water past the float to the backwash tank if the said aperture is closed off; and that the sludge outflow pipe in the floor of the sedimentation tank and the sludge valve in the sludge outflow pipe are directed against gravity to such an extent that when the sludge valve in the sludge outflow pipe is opened a volume of a fluid which is a mixture of water and the granular filter material and which is equivalent to the bulk volume of the granular filter material remains in the sedimentation tank.

11 Claims, 1 Drawing Sheet

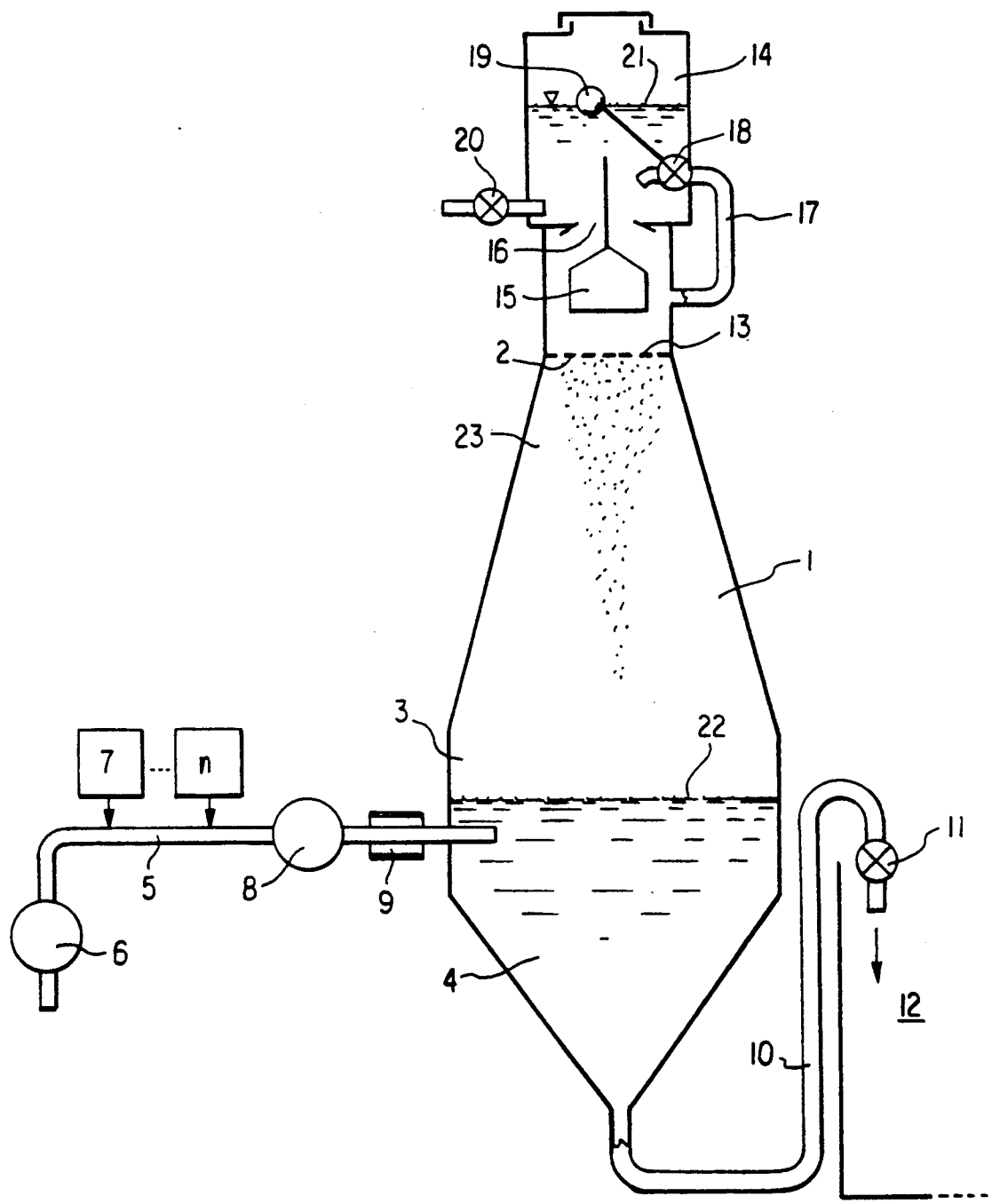

PLANT TO PRECIPITATE SUSPENDED MATTER OUT OF WATER

BACKGROUND OF THE INVENTION

This invention relates to a plant to precipitate suspended matter out of water.

Industrial waste water, landfill leachates, biologically treated waste water and even surface run-off water contain pollutants which must be separated out of the water. These pollutants are either bound to turbid elements or are dissolved in the water. In the first case they are destabilized by the introduction of suitable additives such as ferric(III) salts or aluminium salts. In the second case precipitation with, for example, carbonates or sulphides or adsorption with activated carbon must take place prior to the destabilization. Due to the destabilizing, particles are formed which can be agglomerated together and which can in suitable reactors, such as stirring tanks or cylinder stirrers or in conduits with turbulent flow, grow into flocculates which can be separated out. They can be separated from the water by sedimentation, flotation or by filtration.

With sedimentation and flotation fine flocculates remain in the water which must then be removed by the subsequent filter stage. If filtration is used to remove the flocculates the filter can in some cases block early before that the required amount of filtrate for backwashing has been obtained. The aim has therefore been to combine filtration with one of the two other processes in such a manner that filtration is the last treatment stage.

Even though the advantages of the combination of the two process stages are obvious and have also been discussed at length in publications most plants to be found in practice only consist of a sedimentation stage or of a flotation stage i.e. the filtration stage is missing. The reason is that the filtration stage is regarded as being too complicated, too costly and too prone to break-downs.

The term "filtration" is understood in water treatment terminology to be deep filtration in filter tanks using granular material. The filters are filled with gravel, pumice or anthracite and the direction of flow is from top to bottom. During backwashing, water is directed through the filter in the opposite direction from bottom to top so that the granular material fluidizes and is greatly agitated. The dirt which has settled on the granular material is washed off particularly well in this manner.

With other construction configurations, filtration takes place from bottom to top—that is in the same direction as the backwashing. In this case heavier dirt particles must also be washed through the filter layer as they arrive at the bottom of the filter layer with the untreated water and remain there at first. Other configurations use granular form material which is lighter than water. The upwardly directed filtration can, in this manner, be advantageously combined with a downward backwashing process. In order to prevent the foam material from flowing out of the plant the top and the bottom of the filter area are each closed off with sieves.

Backwashing is a multistage process, in particular in the case of upward backwashing, as for example is the case with gravel filters. The water stored above the filter must at first be let flow out, the filter bed must be broken up by introducing air and special pumps must be available and switched on in order to be able to obtain the high backwash velocity required. The backwash water must be drained off and the filter must then be filled up again prior to the renewed starting up of the filtration process. In all, a large number of measurements must be taken and a large number of regulatory steps must be taken and adhered to. By backwashing the filter filled with granular foam material in a downward fashion, the breaking up of the filter with air is no longer necessary and this halves the cost of the backwashing process. The most outstanding characteristic is nevertheless the strong pumps required for the backwashing process.

A plant for the sedimentation and filtration of water using a flotation plant with a plate separator situated below it is described in DE 35 40 508 A1. The direction of flow of the water to be treated is from bottom to top. Some of the filter material in the flotation plant is removed discontinuously from the lower filtration zone and is cleaned externally in a backwash tank with a rinsing liquid after which the filter material is again introduced to the top of the bed of filter material.

Disadvantages of this plant are that the backwashing process takes place outside the plant, that the backwashing process is carried out using freshwater or using a special rinsing liquid and that only a fraction of the total filter material can be cleaned in the backwash tank. The danger also exists that if the pump fails or if the direction of flow changes the filter material falls downwards and can flow out through the outflow pipe in an uncontrolled manner. The renewed starting up of the plant which has been blocked in this fashion is a lengthy operation.

SUMMARY OF THE INVENTION

It is an object of the invention to provide a plant to precipitate suspended matter out of water which has an improved effectivity whilst only minimally changing the construction.

The advantages of the invention are, in particular, that the highly effective plant is easy to operate so that it is suitable for use in treating turbid water or treating water in general after reaction agents such as, for example, carbonates, sulphides or activated carbon have been introduced with which the pollutants are bound to suspended solids.

In particular the backwashing process has been simplified without at the same time having to do without the high backwash velocity required for efficient filtering.

In an advantageous embodiment of the invention a filter with granular filter material in the form of foam spheres and upward filtration is used and a backwash tank filled with water which has an aperture large enough to enable the contents to be emptied into the filter is situated above the filter. As the emptying can only take place during backwashing the aperture is closed off by a float and the filtrate i.e the filtered treated water is fed to the outlet via a bypass. Advantageously the filtrate flows to the outlet through the backwash tank which is automatically kept full in this way. The volume of the backwash tank defines the length of the backwashing process.

Further disadvantages are done away with by no longer requiring a sieve underneath the filter. Such a sieve destroys the incoming flocculates which then, in consequence, cannot be filtered as well. A sieve which is blocked with filter material will hinder the flow of backwash water by increasing the pressure which leads to additional backwash pumps becoming necessary. Instead of situating the sedimentation tank in front of or above the filter, it is, according to the invention, situated below the filter as part of the plant unit so that a sieve is no longer required and the sedimentation tank can hold all of the filter material during the backwash process. In order to prevent the granular filter material (foam spheres) from flowing out through the sludge outflow pipe in the floor of the sedimentation tank the sludge outflow pipe is directed upwards and its free outflow has been constructed so that the filter material remains in the sedimentation tank.

The backwash process of the device according to the invention is controlled and regulated by opening a single valve namely the sludge valve in the sludge outflow pipe of the sedimentation tank underneath the filter. The filter is rinsed with treated water of a sufficient velocity without the inflow pipe ever having to be closed off.

As soon as the backwash tank is empty the backwash process ends and the sludge valve in the sludge outflow pipe in the floor of the sedimentation tank can again be closed. The filter process starts up automatically after this short break.

The filter process can be still further improved using an advantageous feature if the untreated water flows through a large filter surface area. On the other hand, the backwash water from the aperture should be distributed evenly over the filter area between backwash tank and filter. Due to this, the filter cross-section of an advantageous filter according to the invention is smaller in the outflow area than in the inflow area.

The inflow into the backwash tank is controlled by a float valve in order to compensate for the filter resistance which is low after the backwashing process and which increases constantly during filtration. In this way it is possible to use normal pumps and a regulation of the incoming untreated water flow is not necessary.

The results obtainable with such a plant are illustrated in the following chart for the removal of heavy metals from flue gas wash water:

The chart shows the heavy metal concentration of circulated flue gas wash water from a coal fired power station with a high salt content prior to and after treatment (chloride content 36 g/1).

|  | Cd | Hg | Ni | Pb | Zn |
| --- | --- | --- | --- | --- | --- |
| Plant inflow mg/l | 1 | 0.1 | 4 | 0.6 | 50 |
| Filtrate mg/l | 0.001 | 0.001 | 0.2 | 0.001 | 0.01 |

Model calculations using the residual concentrations obtainable using the plant according to the invention in order to determine the possible benefits felt by the aqautic environment due to the reduction of heavy metals which occur due to flue gas washing show that the values in the table below are obtainable for an industrial nation such as the Federal Republic of Germany.

It can be seen that with regard to environmental protection the use of an efficient flocculation, sedimentation and filtration process on the flue gas wash water of waste incinerators is of much greater importance than when used on the flue gas wash water of coal-fired power stations. But, for example, even in the latter case 200 kg mercury and 1800 kg cadmium per annum can be prevented from entering the environment. It is also logical, that apart from the efficiency of the plant its operational reliability and its construction simplicity and operational ease are of utmost importance with regard to its acceptance in practice, in particular if water treatment is not the main operational aim of the user.

A further table illustrates the environmental benefit for the Federal Republic of Germany if heavy metals are completely precipitated and filtered out of flue gas wash water.

|  | Cd | Hg | Ni | Pb | Zn |
| --- | --- | --- | --- | --- | --- |
| tonnes/annum from coal-fired power stations | 1.8 | 0.2 | 18 | 0.9 | 90 |
| waste incinerators | 7.5 | 600 | 120 | 1140 | 2220 |

BRIEF DESCRIPTION OF THE DRAWINGS

FIG. 1 is a schematic sectional view of an embodiment of a plant according to the invention.

DETAILED DESCRIPTION OF THE INVENTION

The plant as illustrated in FIG. 1 to precipitate suspended matter out of water such as surface run-off water, industrial waste-water, biologically treated waste water and landfill leachates comprises a pump 6 to transport the turbid water through the plant. Incorporated into the incoming pipe 5 is the first dosing station 7 for the introduction of a flocculent into the piping. Further dosing stations ... n are for the introduction of a polyelectrolyte as a flocculation agent and at least one other dosing station for the introduction of reactants such as sulphides, carbonates or activated carbon.

A mixer 8 destabilizes the flocculent after its addition. A pipe 5 which is attached to the mixer 8 is of such a diameter that the water flow rate is such that turbulent flow takes place and forms a flocculation pipe-length 9 where in-pipe flocculation takes place.

The thereon following plant to separate out the flocculates by sedimentation and filtration comprises a filter 1 which is filled with a granular material 23 and which is situated above the sedimentation tank 4 of the plant and in which the direction of flow is from bottom to top.

A backwash tank 14 is filled with filtered water and is attached to the top of the filter 1 and is separated from the filter 1 by a sieve 13. The sedimentation tank 4 situated under the filter 1 forms a constructional unit with the latter. The outflow of the filtrate can be regulated by the outflow valve 20.

A float 15 closes off an aperture 16 with an enlargened cross-section between filter 1 and the backwash tank 14 in the upper position due to bouyancy and on reversal of the direction of flow enables the water from the backwash tank 14 to flow into the filter 1 during the backwashing process with a greater flow rate which increases the effectivity of the backwashing process. The upper part of the float 15, which tapers conically upwards lies in contact with corresponding seal surfaces of the aperture 16 when in the bouyant upper position.

A bypass 17 directs the filtrate i.e the treated and filtered water around the float 15 into the backwash tank 14 if the aperture 16 is closed off by the float 15.

The inflow into the backwash tank 14 is closed off by a floatvalve 18 which is regulated by a second float 19 so that the water level of the filtrate in the backwash tank 14 remains constant.

The filter 1 has a smaller cross-sectional area in the region of the outflow 2 than in the region of the inflow 3. The upper diameter of the filter in outflow area 2 is greater or the same as half the diameter of the filter in inflow area 3. The height of the filter 1 is greater than 40 cm and is preferentially between 1 and 2 m. The filter 1 is dimensioned in such a way that the untreated water flows through the cross-sectional area of the filter 1 with a flow rate of 2 to 15 m$^3$/(m$^2$h) which is equivalent to a surface loading of 2 to 15 m/h. It is filled with Styrofoam spheres 23 with diameters of 0.5 to 1 mm. A sieve 13 is incorporated above the filter 1 to hold back the Styrofoam spheres 23.

The volume of the sedimentation tank 4 situated under the filter 1 is dimensioned so that it can hold all of the granular filter material 23. A sludge outflow pipe 10 with sludge valve 11 at the filter floor is directed upwards against gravity to such an extent that if the sludge valve 11 is opened at least a fluid volume corresponding to the mixture of water and granular filter material 23 equivalent to the bulk volume of the granular filter material 23 remains in the sedimentation tank 4. The illustrated dot-dash water level 22 corresponds to the height of the upwardly directed sludge outflow pipe 10.

A storage tank 12 situated beside the sedimentation tank 4 is constructed so as to hold the total backwash water volume. A sieve at the lower end of the sedimentation tank 4 in the direction of the sludge outflow pipe 10 is no longer required.

During operation of the plant the untreated water is pumped through an incoming pipe 5 by the pump 6. The additives required for the treatment are dosed into the pipe 5 and are mixed with the untreated water in constrictions in the pipe or in other suitable means. To destabilize the suspanded matter a ferric chloride solution is dosed into the untreated water stream. After approx. 30 s a polyamide solution is added as a flocculation agent. This process to form flocculates from turbid matter in water is termed in-pipe flocculation and is described in detail in technical publications. After approx. another 120 s reaction time in the pipe segment with turbulent flow 9 the flocculates have formed so that the untreated water stream can be introduced to the plant according to the invention.

The untreated water with the fully formed flocculates which consist of destabilised turbid matter or precipitated pollutants enters the sedimentation tank 4 tangentially. The flow rate is dimensioned so that in relation to the cross-sectional area of the sedimentation part 4 the upward motion of the water is between 2 to 15 m$^3$/(m$^2$h) which corresponds to 2 to 15 m/h. A smaller surface loading is uneconomical and a higher surface loading is not advantageous as not enough flocculates can be sedimented out. The height of the sedimentation tank 4 can be chosen freely and does not influence the results. It is suggested that the height is the same as the diameter. In this way the plant can be dimensioned if the incoming untreated water flow rate and the available interim storage volumes are known.

A complete sedimentation of the flocculates in the sedimentation tank 4 is not necessary as the flocculates are held back in filter 1 situated above the sedimentation tank 4. At first, the filter 1 has the same cross-sectional area as the sedimentation tank 4. It is filled with Styrofoam spheres 23 of suitable diameter in particular d=0,5 to 1,5 mm. The height of the filter can be dimensioned in accordance with the actual room height and the desired filtering time whereby a filter with more volume can retain more turbid matter than a filter of a flatter construction. It is therefore recommended not to have a filter height smaller than 40 cm. Filter heights between 1 and 2 m are advantageous from an operational viewpoint.

The upper diameter of the filter at 2 should not be greater than half of the diameter of the filter at 3. In that way the (area 3)$\leq 4$. (area 2). The upward velocity of the water at 3 is mathematically equivalent to the velocity in the sedimentation part 4, namely 2 to 15 m/h, and at 2 is at most four times greater than the velocity in the sedimentation part 4, namely 8 to 60 m/h. A greater throughflow in the filter leads to a destruction of the flocculates and to worse results.

The water raises the float 15 and closes off the aperture 16 situated above it. The water must flow into the backwash tank 14 via the bypass 17. The volume rate is regulated at the outflow of the backwash tank 14 by outflow valve 20. A float valve 18 throttles the outflow of the bypass 17 into the backwash tank 14 so that only the throughput volume regulated at the outflow valve 20 is allowed through the whole plant.

If the throughput is too small (blockage) or the water is turbid (breakthrough of the filter) a backwashing of the plant is initiated. The sludge valve 11 in the sludge outflow pipe 10 is opened. The float 15 sinks and the aperture 16 is opened which leads to a strong downward flow of water sufficient to agitate and clean the filter 1. The Styrofoam spheres 23 sink down into the sedimentation tank 4 but cannot leave there if the free flow outflow of the sludge outflow pipe 10 is situated at such a height that at least that volume remains in the sedimentation part 4 which corresponds to the bulk volume of the Styrofoam spheres 23. As soon as the strong downward flow of water ends the backwashing process ceases. The sludge valve 11 at the sludge outflow pipe 10 is closed. The untreated water stream fills the plant, the Styrofoam spheres 23 fill up the top area of the filter 1 again and the plant automatically takes up the treatment i.e. the precipitation of suspended matter out of the untreated water.

It will be understood that the above description of the present invention is susceptible to various modifications, changes and adaptations, and the same are intended to be comprehended within the meaning and range of equivalents of the appended claims.

What is claimed is:

1. A plant to precipitate suspended matter out of water, including surface run-off water, industrial waste water, biologically treated waste water and landfill leachates and for the subsequent sedimentation and filtration of the formed flocculates said plant comprising a. a pump for transporting the turbid water through the plant,
   b. a first dosing means for introducing a flocculent into the pipe,
   c. a second dosing means for introducing a flocculation agent in the form of a polyelectrolyte into the pipe,
   d. a mixing means for destabilizing the turbid matter after introduction of the flocculents, e. a pipe connected to the mixing means said pipe being of such a diameter to enable a turbulent throughput of the water,
f. a sedimentation tank including a sludge outflow pipe and a floor, wherein said sludge outflow pipe in the floor of said sedimentation tank and the sludge valve in said sludge outflow pipe are arranged to be directed against gravity to such an extent that when said sludge valve in said sludge outflow pipe is opened a volume of fluid which is a mixture of water and said granular filter material and which is equivalent to the bulk volume of said granular filter material remains in said sedimentation tank
g. a filter arranged to contain granular filter material situated above said sedimentation tank, the direction of flow through said filter bin 8 from bottom to top, and wherein the volume of said sedimentation tank is dimensioned so that it can hold all of said granular filter material, and
h. a backwash tank, said backwash tank for filtered water being situated above said filter, and
i. a float which seals off an aperture with an enlargened cross-section connecting said filter with said backwash tank in a position raised by bouyancy and which disconnects and opens said aperture so as to allow said filter to be backwashed when the direction of flow is from top to bottom and is at a fast flow rate to improve the effectiveness of the backwashing process,
j. a bypass means which directs said treated filtered water past said float to said backwash tank if said aperture is closed off.

2. A plant as defined in claim 1, wherein the outflow of said bypass is closed off by a floatvalve regulated by a second float in such a manner that the level of said filtered water in said backwash tank remains constant.

3. A plant as defined in claim 1, wherein the diameter of said filter in the outflow area is smaller than the diameter of said filter in the inflow area.

4. A plant as defined in claim 3, wherein said diameter of said filter in the outflow area is greater than or equal to half of said diameter of said filter in the inflow area.

5. A plant as defined in claim 4, wherein the height of said filter is greater than 40 cm and is in particular between 1 and 2 m.

6. A plant as defined in claim 1, wherein said filter is dimensioned so that the surface loading of said sedimentation tank is between 2 and 15 $m^3/(m^2h)$, so that the water correspondingly flows upwards with a velocity of approximately 2 to 15 m/h.

7. A plant as defined in claim 1, wherein said filter is filled with Styrofoam spheres with a diameter preferably of 0.5 to 1.5 mm.

8. A plant as defined in claim 1, wherein said sedimentation tank forms a constructional unit with said filter.

9. A plant as defined in claim 1, wherein just one sieve is situated above said filter.

10. A plant as defined in claim 1, wherein it comprises a storage tank situated beside said sedimentation tank which can hold the total backwash volume.

11. A plant as defined in claim 1, wherein it comprises at least a third dosing means for the introduction of reactants including sulphides, carbonates or activated carbon.

* * * * *